(12) United States Patent
Karia et al.

(10) Patent No.: US 10,877,667 B2
(45) Date of Patent: Dec. 29, 2020

(54) SUPERVISED LEARNING WITH CLOSED LOOP FEEDBACK TO IMPROVE IOCONSISTENCY OF SOLID STATE DRIVES

(71) Applicant: Western Digital Technologies, Inc., San Jose, CA (US)

(72) Inventors: Rushang Karia, Tempe, AZ (US); Mervyn Wongso, Gilbert, AZ (US); Jacob Schmier, Gilbert, AZ (US); Kevin Corbin, Chandler, AZ (US); Lakshmana Rao Chintada, Gilbert, AZ (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 238 days.

(21) Appl. No.: 15/947,665

(22) Filed: Apr. 6, 2018

(65) Prior Publication Data
US 2018/0329626 A1 Nov. 15, 2018

Related U.S. Application Data

(60) Provisional application No. 62/505,491, filed on May 12, 2017.

(51) Int. Cl.
*G06F 3/00* (2006.01)
*G06F 3/06* (2006.01)
*G06N 20/00* (2019.01)
*G06F 15/76* (2006.01)
*G06F 11/34* (2006.01)

(52) U.S. Cl.
CPC ............ *G06F 3/061* (2013.01); *G06F 3/0616* (2013.01); *G06F 3/0679* (2013.01); *G06F 11/34* (2013.01); *G06F 15/76* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,387,340 B1* | 8/2019 | Baryudin | G06F 3/064 |
| 2013/0297907 A1* | 11/2013 | Ki | G06F 12/0684 711/170 |
| 2017/0123730 A1* | 5/2017 | Losh | G06F 3/067 |
| 2018/0173464 A1 | 6/2018 | Wongso et al. | |

* cited by examiner

*Primary Examiner* — David Yi
*Assistant Examiner* — Craig S Goldschmidt
(74) *Attorney, Agent, or Firm* — Patterson & Sheridan, LLP; Steven H. Versteeg (57) ABSTRACT

A method and apparatus is disclosed for using supervised learning with closed loop feedback to improvement of output consistency for memory arrangements, such as a solid state drive.

19 Claims, 8 Drawing Sheets

SUPERVISED LEARNING WITH CLOSED LOOP FEEDBACK TO IMPROVE IOCONSISTENCY OF SOLID STATE DRIVES

CROSS-REFERENCE TO RELATED APPLICATIONS

This application claims priority to U.S. Provisional Patent Application 62/505,491, filed May 12, 2017, the entirety of which is incorporated by reference.

FIELD OF THE DISCLOSURE

Aspects of the disclosure relate to memory systems used in conjunction with a host, such as a computer. More specifically, aspects relate to providing systems that increase input output (IO) consistency for solid state drives (SSDs).

BACKGROUND INFORMATION

Field

The need for storage and retrieval of information is increasingly important as computer systems increase in efficiency and capabilities. Correspondingly, the cost per gigabyte of SSDs has decreased. Expectations of purchasers of these system demand faster access to these types of drives, compared to conventional had disk drives (HDDs).

SSD use different systems and methods to store data. Of specific importance is the maintenance of low latency and constant throughput for the SSD. SSDs are used for their superior low latency as compared to HDDs. During operations, garbage collection plays an important role in determining the constant throughput of the SSD. Garbage collection allows the system to collect unused or seldom used data for disposal. While the average user does not see the garbage collection activities that occur, if garbage collection occurs at an inopportune time, the garbage collection activities can harm the overall throughput of the SSD, causing performance limitations.

Operations to slow the SSD defeat the purpose of the SSD to provide users with superior performance parameters. Slowing the SSD to perform garbage collection and other ministerial functions, therefore, provides a less than optimum solution for providing IO consistency. To ensure that garbage collections proceeds and does not impact the overall throughput, the SSD can be operated at a level below a maximum throughput. The user, therefore, will not experience a decreased throughput when garbage collection occurs.

There is a need, therefore, to provide a level of IO consistency for a solid state drive that does not severely impact the overall performance of the solid state drive.

There is also a need to provide a method that will limit performance losses that may be experienced by garbage collection and other functions based upon various factors, such as computer usage.

There is a further need to provide methods that will automatically limit performance losses, as above, that may be based upon machine learning techniques, to limit the overall variations in performance capabilities.

There is also a need to provide a method that does not alter the endurance of the SSD and may increase the overall longevity based upon optimal usage of the SSD.

SUMMARY

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In one non-limiting embodiment, an arrangement to perform supervised learning with a closed loop feedback for a solid state drive is disclosed comprising a workload detection engine configured to receive an input command from a host, a command dispatcher configured to receive the input command from the host, a flash memory with a connection for receiving and sending data, a command processor connected to the command dispatcher, the command processor configured to perform commands provided by the command dispatcher, the command processor connected to the flash memory through the connection, an engine configured to receive a set of data from the workload detection engine, the engine configured to calculate throttling latencies for the solid state drive and a host responder connected to the command dispatcher and the engine, the host responder configured to respond to the host with completed commands.

In another non-limiting embodiment, a method for improving an input and an output consistency of a solid state drive is disclosed comprising: calculating a minimum system imposed read and write latency for the solid state drive; calculating an expected read latency and an expected write latency for the solid state drive based on the minimum system imposed read and write latency; calculating an amplification coefficient for write operations and an amplification coefficient for read operations based upon a model, calculating a final read latency and a final write latency for the solid state drive based upon the calculated expected read latency and the calculated expected write latency and the amplification coefficient for write operations and the amplification coefficient for read operations and operating the solid state drive according to the final read latency and the write latency.

In another non-limiting embodiment, an apparatus for calculating a final write latency and a final read latency for a solid state drive is disclosed comprising means for calculating a minimum system imposed read and write latency for the solid state drive; means for calculating an expected read latency and an expected write latency for the solid state drive based on the calculated minimum system imposed read and write latency; means for calculating an amplification coefficient for write operations and an amplification coefficient for read operations and means for calculating a final read latency and a final write latency for the solid state drive based upon the calculated expected read latency and the expected write latency and the amplification coefficient for write operations and amplification coefficient for read operations and means for operating the solid state drive to perform read operations and write operations based upon the final read latency and the final write latency.

In another non-limiting embodiment, a method for operating a solid state drive is disclosed comprising calculating at least one of a minimum system imposed read and write latency for the solid state drive, calculating at least one of an expected read latency and an expected write latency for the solid state drive based upon the minimum system imposed read and write latency for the solid state drive, calculating at least one of an amplification coefficient for write operations and an amplification coefficient for read operations, calculating at least one of a final read latency and a write latency for the solid state drive based upon the calculated expected read latency and the expected write latency and the at least one of the amplification coefficient for write operations and the amplification coefficient for read operations and operating the solid state drive such that operations of the solid state drive do not exceed the at least one final read latency and write latency for the solid state drive.

In another non-limiting embodiment, a method of operating a solid state drive is disclosed comprising: calculating one of a minimum system imposed read and write latency for the solid state drive; calculating one of an expected read latency and an expected write latency for the solid state drive based upon the one of the minimum system imposed read and write latency for the solid state drive, calculating one of an amplification coefficient for write operations and an amplification coefficient for read operations, calculating one of a final read latency and a final write latency for the solid state drive based upon the calculated expected read latency and the calculated write latency and the calculated amplification coefficient for write operations and the amplification coefficient for read operations; and operating the solid state drive according to the final read latency and the write latency.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, performing supervised learning with closed loop feedback to improve IO consistency of solid state drives. In the embodiments described, a data storage arrangement is connected to the host system. The function of the data storage arrangement is to accept data and store the data until needed again by a user or the host. The data storage arrangement may be configured to accept bursts of data, depending on the computer process performed, therefore the data storage arrangement is configured with multiple memory units that provide various states of usage. Certain sections of the data storage arrangement are configured of memory systems that provide fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a Statistical Analysis System (SAS) Interface or Serial ATA (SATA) compatible interface, as non-limiting embodiments. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide fast performance for smooth streaming. Wireless technology may use, for example, between 2.5 GHz to 5 GHz frequencies for connection. In some embodiments, the data storage may allow users to choose the frequencies for wireless connection. While being described as SATA compatible, other types of interfaces may be used.

Auxiliary connections may be provided to the data storage arrangement to allow additional options for inputting data directly to the data storage arrangement without interfacing with the host. Such direct input of data may be provided through placement of an integrated secure digital card to offload or copy data. Other auxiliary connections may be provided for additional IO operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. An example battery indicator may be a low energy consumption light emitting diode technology. In specific embodiments, the data storage arrangement may be provided with a circuit to allow charging and prevent overcharging of the system if the data storage arrangement is connected to an outside power supply for an extended period of time. In some embodiments, circuitry may be used to determine if a threshold of inactivity has been reached for the storage system, thereby causing the system to enter a low power consumption mode and conserve battery power.

In one non-limiting embodiment, a controller is provided to control actions of the data storage arrangement as required by the host. The controller may also be configured to perform maintenance activities for the data storage arrangement to allow efficient use.

Internal software may be provided on the data storage arrangement to allow efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier Media Access Control (MAC) address and device name to allow the system to operate on an independent basis. The storage system may also be operated in a configuration that allows for the system to clone a MAC address of a computer to which it is attached.

The overall capacity of the data storage arrangement may vary according to the different embodiments provided. Capacities 1 TB, 2 TB up to 64 TB may be provided, as non-limiting embodiments. Different form factors may also be provided. In some embodiments, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

In example embodiments, as industry changes in computer operations from HDDs to SSDs occur, speeds of operations increase. Advantageously, SSDs do not use moving parts for data access and therefore provide superior operation compared to HDDs. SSDs, however, require older data to be garbage collected to avoid data loss.

A process called write amplification is an undesired phenomenon associated with flash memory where the actual amount of physical information written is a multiple of the logical amount to be written. As more writes happen because of the write amplification process, the drive experiences a reduced life as drives have a fixed program and erase (PE) count.

Garbage collection presents significant challenges to Quality of Service (QoS) of SSDs since SSDs have to ensure that non-host data is recycled. In some industries, SSD places a premium on performance, therefore low latency is of prime importance. In other industries, quality of data retention is more important, therefore speed is less of a concern as compared to data quality. For most users, there is usually a compromise that is made between quality of service and performance. Aspects of the disclosure provide a method that allows for adaptable performance of a SSD, for example, to ensure that quality of service is maintained as well as adequate performance.

Definitions of Values

For purposes of definition, a page size, $\Omega$, is defined as the atomic unit of data transfer within the drive. Page size is measured in multiples or 4096 or 4 k.

Write amplification, $\alpha$, of a solid state drive is a ratio of the total number of flash writes to the total number of host issued writes.

SSDs allocate a certain amount of internal memory as a write cache $\Xi$, to enhance write performance. The cache contains writes that have not made it to the flash memory but are guaranteed to be completed under unexpected events like a power failure.

The queue depth, $\psi$, of a workload is defined to be the maximum number of commands that the host program may send to the drive at any given moment.

The R/W mix of a workload is defined to be the ratio of the total number of reads and writes that the host program maintains at all times. For example, if the ratio is 75/25 and the host program has sent 12 commands to the drive, 9 of them will be reads and the other 3 will be writes.

Block size of a workload is the unit of transfer that the host program uses to perform operations on the drive. The read and write block sizes are denoted as $B_r$ and $B_w$ respectively wherein the subscript r is reading and w is writing. The host program may send different block sizes over any constant interval t. The block sizes for the workload are interpreted to be the average of all different block sizes over t. $B_r$ and $B_w$ are used to represent the average read and write block sizes over an interval t. The value of $\overline{B_{rw}}$ may be defined as the block size for a read or write operation.

$$\overline{B_{rw}} = \overline{B_{rw}}, \text{ if } \overline{B_{rw}} = \Omega \quad \text{EQ. 1A}$$

$$\overline{B_{rw}} = \Omega \left| \frac{B_{rw}}{\Omega} + \frac{1}{2} \right|, \text{ if } B_{rw} > \Omega \quad \text{EQ. 1B}$$

The block alignment, $B_A$ is a measure of the addresses in terms of logical pages that the host program uses to perform operations on the drive. Generally, if $B_A = B_{rw}$ the workload is said to be aligned and is represented as $B_{A=}$ while for other values, the workload is deemed unaligned and is represented as $B_{A\neq}$.

The address pattern is the range of logical block addresses (LBAs) the host program issues to the drive. These ranges may be classified as random and sequential.

Latency is measured as the total interval of a single IO command to complete from when the host first submitted the command to the operation system or driver. $L_r$ and $L_w$ represent the latencies for the reads and writes respectively.

The IOPS of a drive is defined to be the total number of IO's that are completed per unit of time. Similarly, the bandwidth, BW, of a drive is the total amount of data transferred per unit of time. Typically, the unit of time is measured in seconds.

$$IOPS_{RW} = \frac{\psi}{L_{RW}} \quad \text{EQ. 2}$$

$$BW_{RW} = IOPS_{RW} \times B_{RW} \quad \text{EQ. 3}$$

Linear regression is defined as the method to model relationships between a single output variable, y and several different input variables x. The output of a linear regression is a model of the form:

$$y = \theta_0 + \theta_1 x_0^a x_1^b \ldots x_n^z + \ldots + \theta_N x_0^a x_1^b \ldots x_n^z \quad \text{EQ4}$$

Aspects of the disclosure provide a scalable approach to providing IO consistency using a supervised learning based throttling mechanism. Aspects described work in a continuous domain and are scalable across several workloads. For complex workloads, for example ones with mixed block sizes, performance requirements are maintained without leveraging IO consistency.

Let the element S be any SSD. Let $R_{max}$ and $W_{max}$ be the maximum possible IOPS of S at $B_{A\neq}$ with $B_r = B_w = \Omega$. For any given workload, the latencies increase linearly above any queue depth, $\psi$, where $R_{max}$ and/or $W_{max}$ has been obtained. The latencies increase by an amount proportional to $$\frac{\psi_{new}}{\psi_{old}}.$$

This queue depth is labeled as the saturation queue depth of the workload or $\psi_{sat}$. Queue depths lower than $\psi_{sat}$ may have a non-linear relationship between latencies.

$R'_{max}$ and $W'_{max}$ for a given block size, $B'_{rw} > \Omega$ are proportional to $$\frac{B'_{rw}}{\Omega_{rw}}.$$

The effective queue is also defined for a workload. Let $\psi_r = \psi \times P_r$ and $\psi_w = \psi \times P_w$ be the effective read and write queue depths of the workload. These quantities represent the approximate number of reads and writes active in the drive at any particular moment of time based on the assumption that the host program honors the remix of the workload.

The minimum system imposed latency, $\mu_{rw}$ are the minimum latencies in S under the assumption of an infinite write cache and infinitely fast memory. The base latency of S is the latencies experienced by the system at value of $\psi = 1$.

$$L_{\beta_R} = \frac{1}{R'_{MAX}} \text{seconds} \quad \text{EQ. 5}$$

$$L_{\beta_W} = \frac{1}{W'_{MAX}} \text{seconds} \quad \text{EQ. 6}$$

Note that the above equations ignore the non-linear relationship for any $\psi = \psi_{sat}$. Finally, a linear regression model of the second order is defined as:

$$y = \theta_0 x^2 + \theta_1 x + \theta_2 \quad \text{EQ. 7}$$

Defining two (2) models in EQ. 8 (model 1) and EQ. 9 (model 2):

$$\phi_r[x] = \theta_0 P_r^2 + \theta_1 P_r^2 + \theta_2 \quad \text{EQ. 8}$$

$$\phi_w[x] = \theta_0 P_w^2 + \theta_1 P_w^2 + \theta_2 \quad \text{EQ. 9}$$

Where $\phi_{rw}[x]$ is defined as the amplification factor which is used to amplify the computed latencies. The factor [x] allows for representation of a $2^{nd}$ order model as a higher order equation which retaining simplicity. As a non-limiting example, one of two different models may be selected based upon whether the reads are dominating the workload or not. A rule, for this non-limiting example, may be that if reads are less than 50% then model 1 is used (Equation 8). In other instances model 2 is used (Equation 9).

For any workload, the expected read and write latencies $L'_{rw}$ are computed below:

$$L'_r = \psi_r \times L_{\beta_r} - \mu_r \quad \text{EQ. 10}$$

$$L'_w = \psi_w \times L_{\beta_w} - \mu_w \quad \text{EQ. 11}$$

Figure 1:
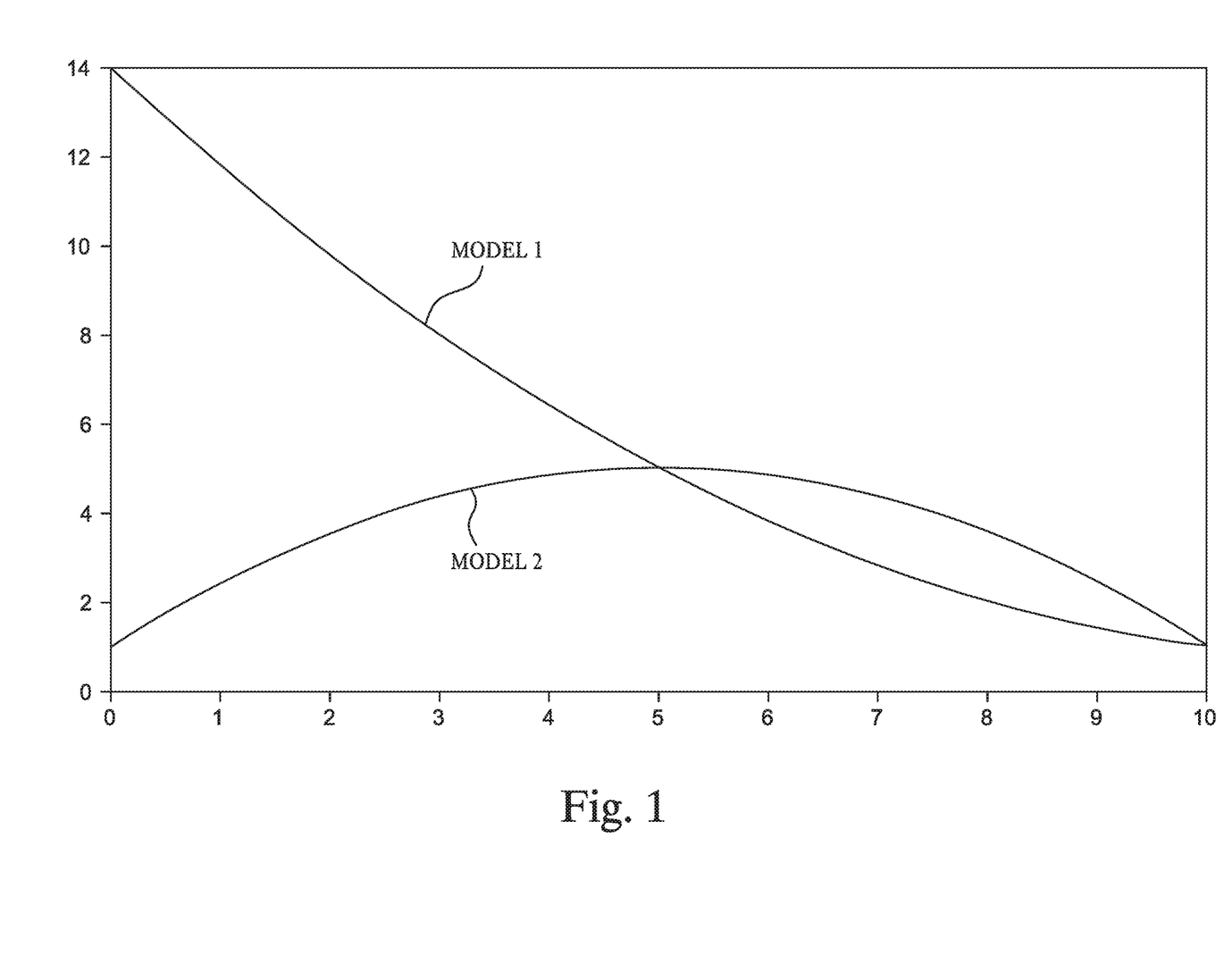
FIG. 1 is a graph of two models used in determining whether certain criteria are dominant or not.

These are the expected latencies that the system will experience under the workload in consideration assuming the system is behaving in an ideal fashion. These latencies do not guarantee IO consistency. Referring to FIG. 1, the two models (model 1 and model 2) are shown in a graph representation.

Computation of amplification coefficients, $\phi_{rw}$ is performed by using linear regression models. Then the final latencies are computed as follows:

$$L''_r = L'_r \times \phi_r[x] \quad \text{EQ. 12}$$

$$L''_w = L'_w \times \phi_w[x] \quad \text{EQ. 13}$$

These latencies are then fed to firmware as completion latencies. Any commands which complete before these will wait in the firmware and will not be completed to the host. This helps other firmware activity like garbage collection to catch up and free central processing unit time helping in IO consistency.

Next, ideal values of coefficients $\theta_n$ are calculated. The value a is the maximum deviation of the IOPS from the average. This value defines IO consistency. Next, let x be the maximum performance that may be dropped from a drive without throttling. The performance values from several workloads in the absence of throttling are computed and tabulated. Gradient descent is used to adjust the $\theta$ based on a cost function in terms of x and $\sigma$. Once $\theta$ values are established, test workloads are run to check if the model remains compliant and provides a good fit to the data. Once the learning process has been deemed to be complete, the code that is used to learn the model may be disabled or removed. Overhead is thus minimized through this action.

If requirements change from different installations, the learning process can be reactivated. Since this method does not interfere with drive architecture, the method does not change the endurance of the drive. As the drive ages, depending on NAND characteristics, the learning may or may not need to be reactivated.

Another consideration for the system and methods described is adapting the system to unusual events. In some embodiments, the firmware might enter into an undesirable state. The dynamic throttling mechanism can handle this scenario by having closed loop feedback to determine whether such an even is active or not. Depending upon that, the latencies might be adjusted for a brief amount of time (in possibly discrete steps).

Figure 3:
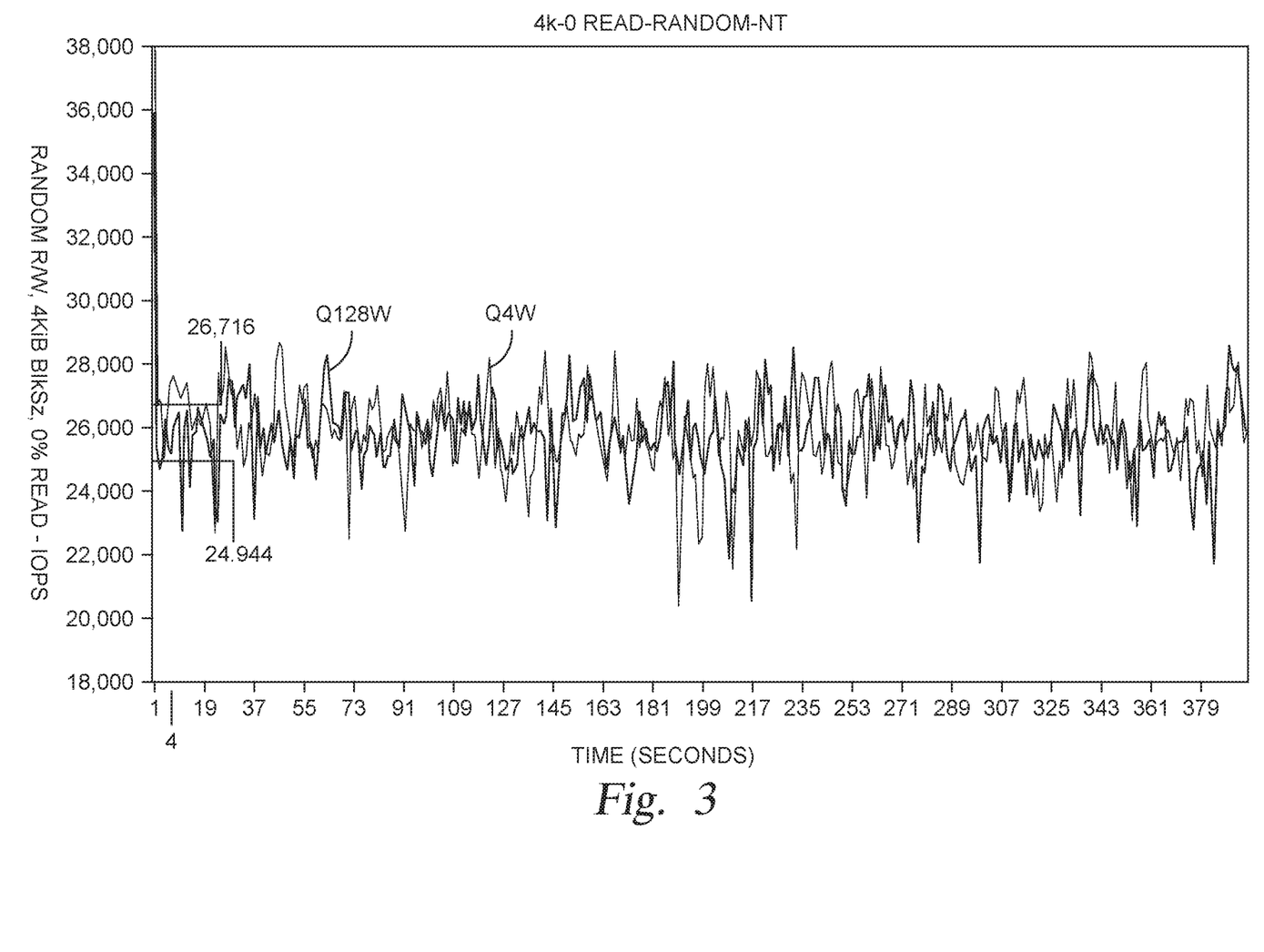
FIG. 3 is a graph of random R/W IOPS vs. time.
Figure 4:
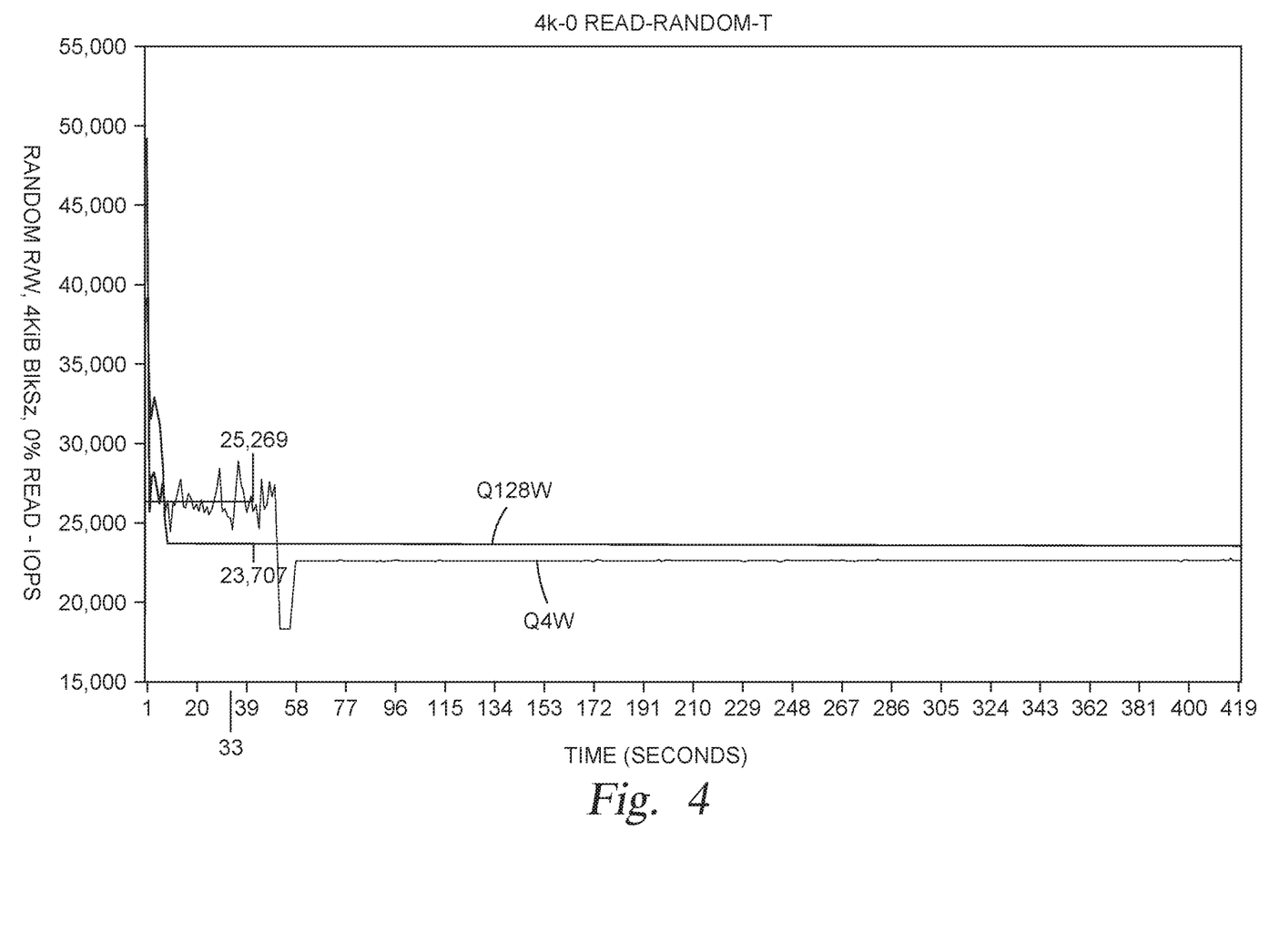
FIG. 4 is a graph of random R/W IOPS vs. time implementing the algorithms of the present disclosure.

Referring to FIG. 3, a graph of random R/W, 4 KiB, with 0% read for input output operations per second per unit of time (seconds) is illustrated. As provided, without use of the algorithm, the values of input and output operations per second vary along the entire time (x) axis. Referring to FIG. 4, with the algorithm enabled, the value of input output operations per second per unit of time is relatively constant along the entire time (x) axis.

Figure 5:
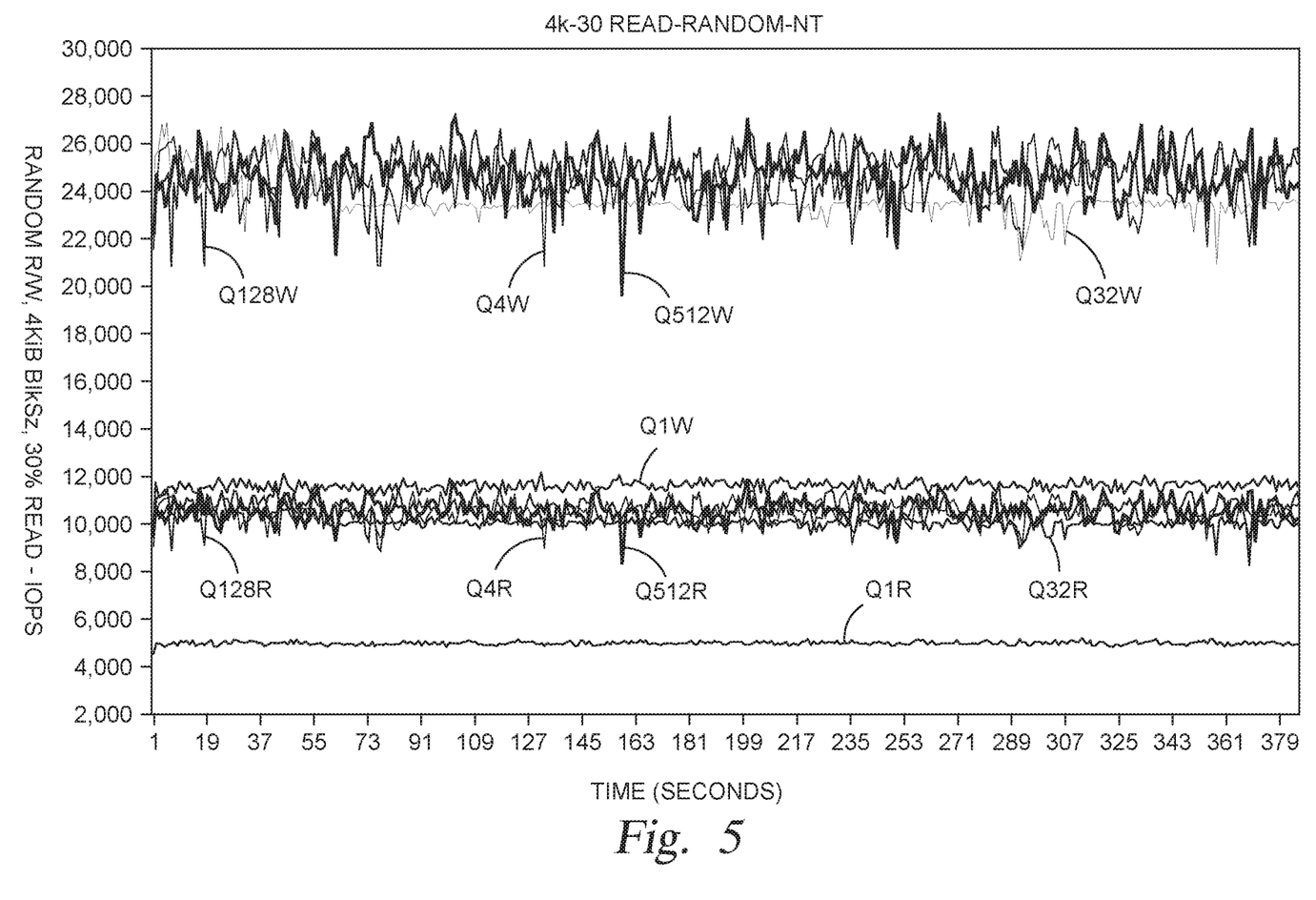
FIG. 5 is a graph of random R/W with 30% read IOPS vs. time.
Figure 6:
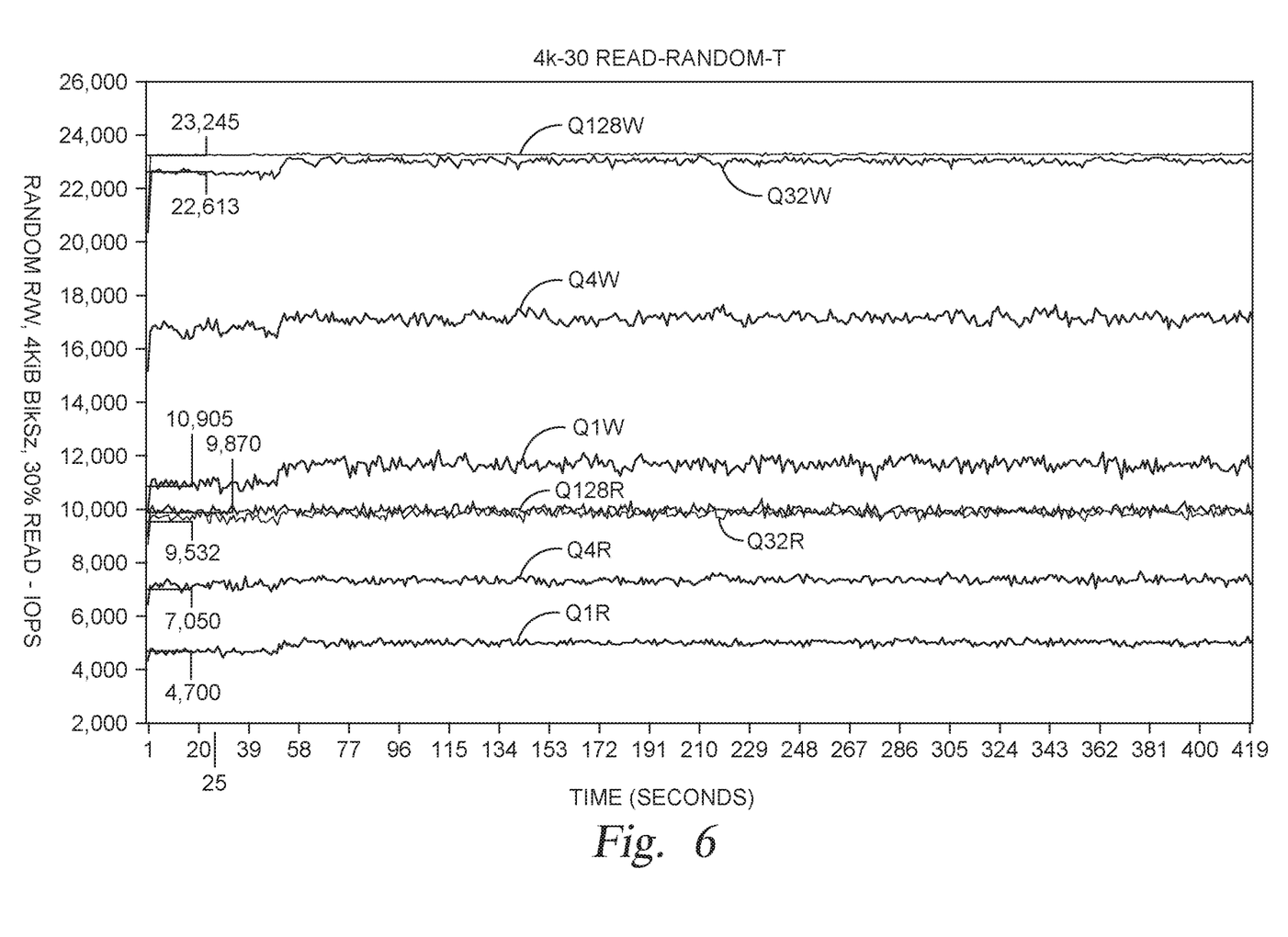
FIG. 6 is a graph of random R/W with 30% read IOPS vs. time implementing the algorithms of the present disclosure.

Referring to FIG. 5, for a 30% read IOPS parameters, the graph along the (x) axis indicates a variability along the time (x) axis without use of the algorithm. Referring to FIG. 6, with the algorithm enabled (for the data in FIG. 5) the value of the input output operations per second per unit of time is relatively constant along the entire time (x) axis.

Figure 7:
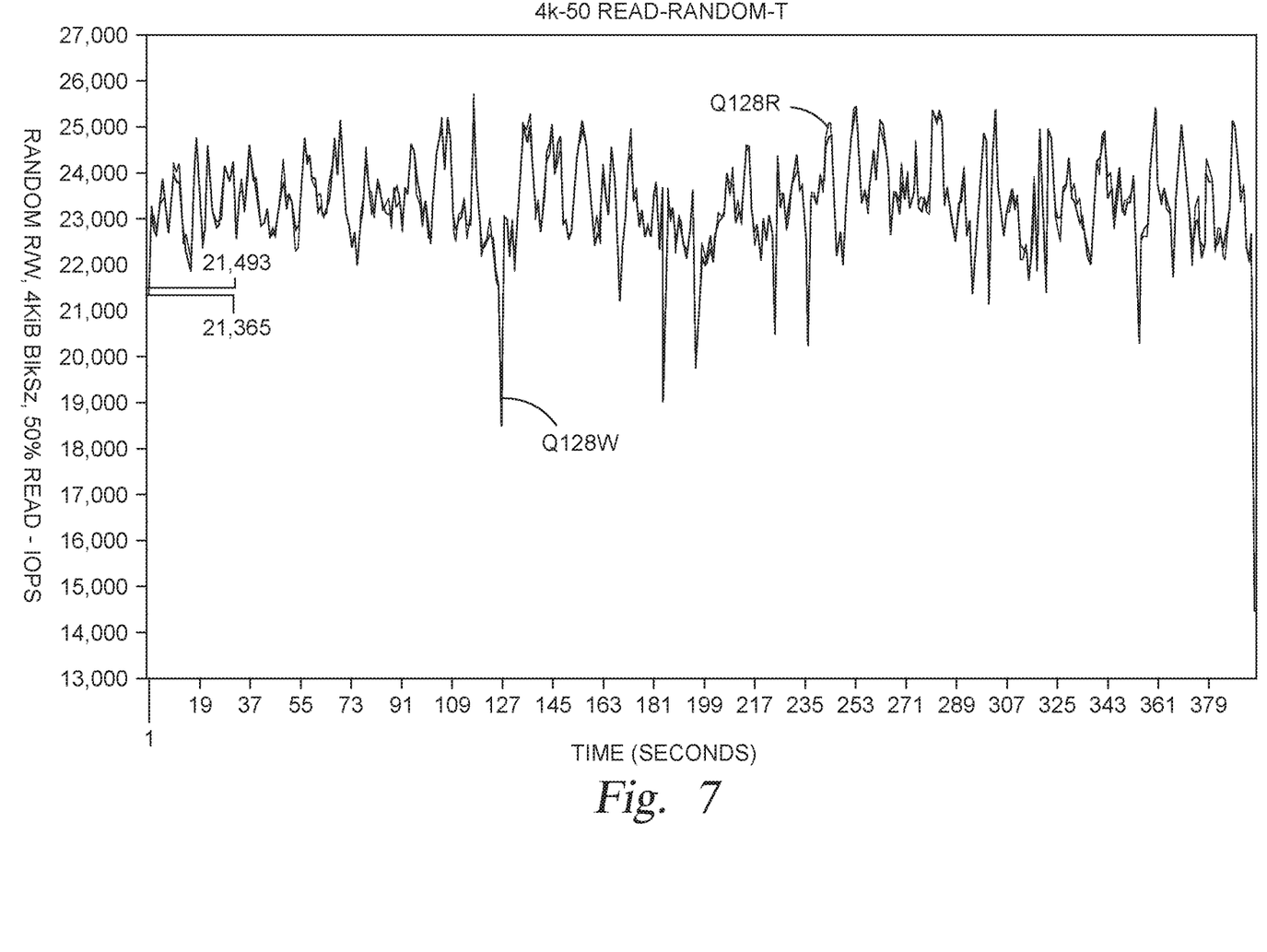
FIG. 7 is a graph of random R/W with 50% read IOPS vs. time.
Figure 8:
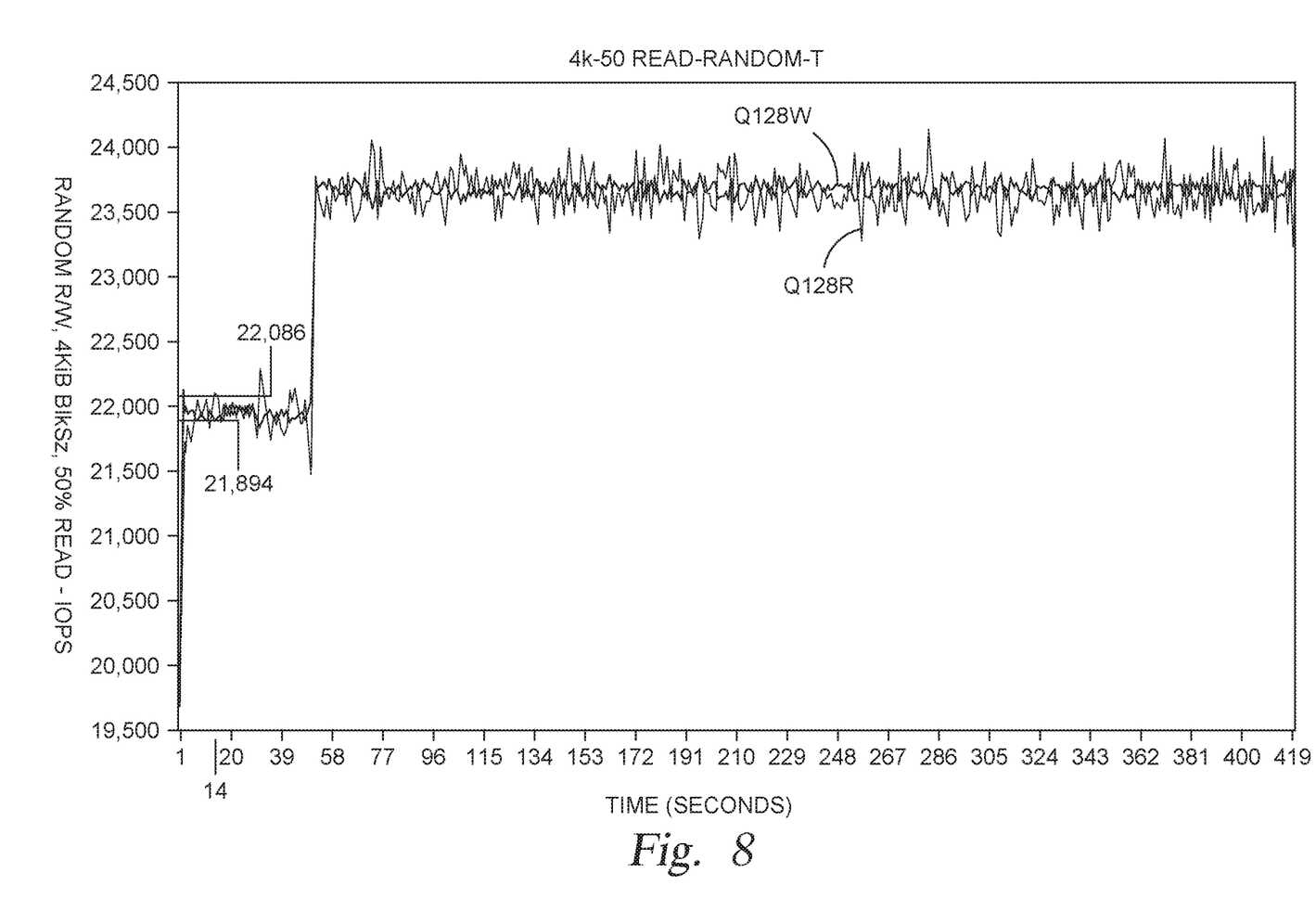
FIG. 8 is a graph of random R/W with 50% read IOPS vs. time implementing the algorithms of the present disclosure.

Referring to FIG. 7, for a 50% read input output operations per second, the graph along the entire time (x) axis shows significant variability without use of the algorithm. Referring to FIG. 8, with the algorithm enabled (for the data in FIG. 7), after a first period of variability, the variability diminishes over time to the end of the time (x) axis.

Figure 2:
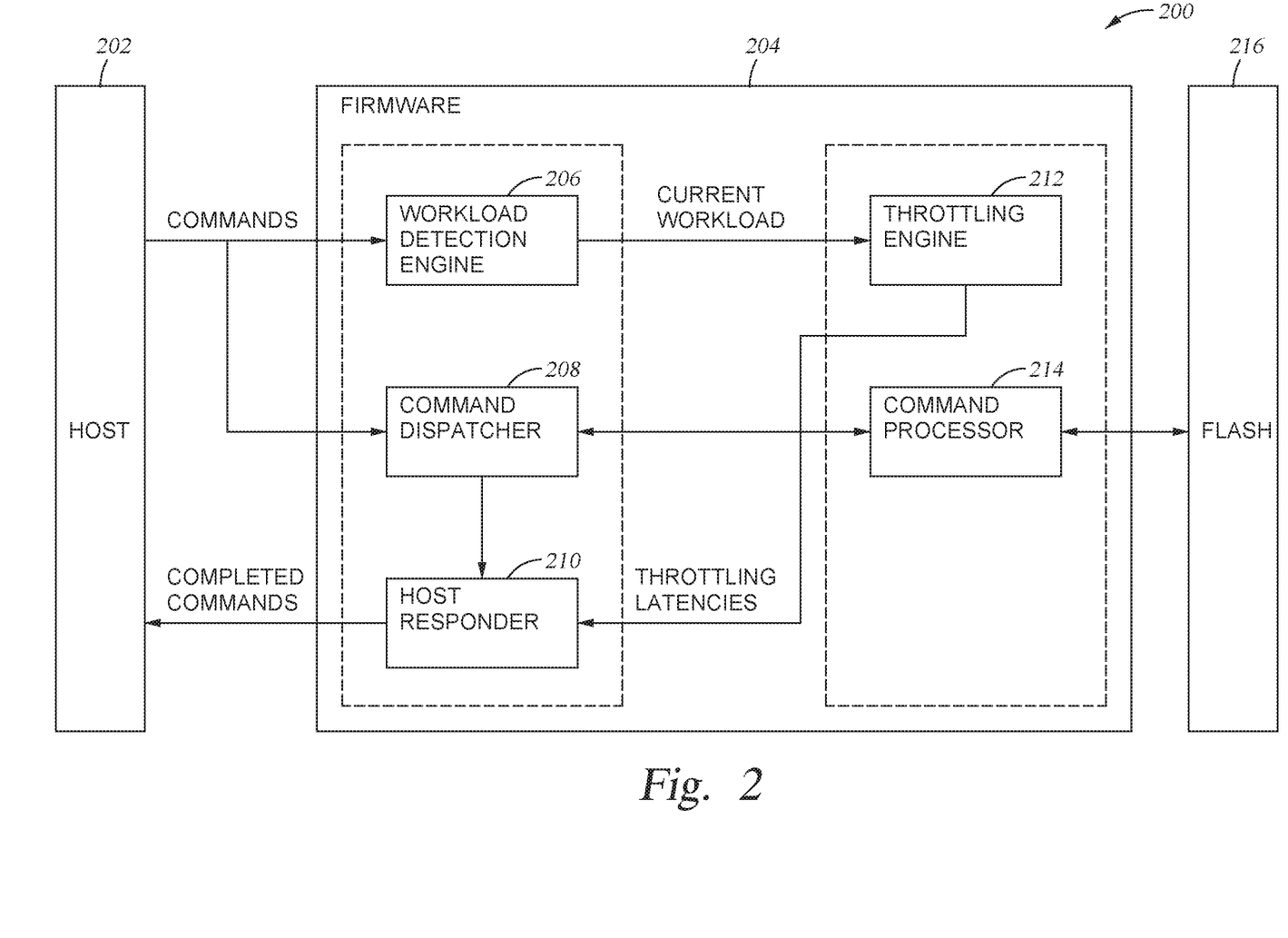
FIG. 2 is a schematic of a throttling engine.

Referring to FIG. 2, an arrangement 200 is illustrated that is configured to conduct the methods described. A host 202 is provided in a connected arrangement to firmware 204 which is in turn connected to flash 216. Commands are obtained from the host 202 and sent to a workload detection engine 206 and a command dispatcher 208. The command dispatcher 208 is connected to a host responder 210 that responds back to the host 202 with completed commands. The workload detection engine 206 is connected to a throttling engine 212 that provides calculated throttling latencies to the host responder 210. The workload detection engine 206, in one embodiment, may be a means for calculating read and write latencies. The command dispatcher 208 is connected to a command processor 214. In one embodiment, the command processor 214 may be a means for calculating an amplification factor. In another embodiment, other components of FIG. 2 may be combined to the command processor 214 to calculate expected read latencies and write latencies. In still further embodiments, the processor 214 may be used to calculate final read and write latencies. The connection between the command dispatcher 208 and the command processor 214 allows for two (2) way communication. The command processor 214 is connected to a flash 216 with both input and output capabilities.

In one non-limiting embodiment, an arrangement to perform supervised learning with a closed loop feedback for a solid state drive is disclosed comprising a workload detection engine configured to receive an input command from a host, a command dispatcher configured to receive the input command from the host, a flash memory with a connection for receiving and sending data, a command processor connected to the command dispatcher, the command processor configured to perform commands provided by the command dispatcher, the command processor connected to the flash memory through the connection, an engine configured to receive a set of data from the workload detection engine, the engine configured to calculate throttling latencies for the solid state drive and a host responder connected to the command dispatcher and the engine, the host responder configured to respond to the host with completed commands.

In another non-limiting embodiment, the arrangement may be configured wherein the engine is a throttling engine.

In another non-limiting embodiment, the arrangement may be configured wherein the set of data from the workload detection engine is a current workload.

In another non-limiting embodiment, the arrangement may be configured wherein the flash memory is NAND flash memory.

In another non-limiting embodiment, the arrangement may be configured wherein the throttling engine is connected to the command processor.

In another non-limiting embodiment, the arrangement may be configured wherein the throttling engine provides throttling latencies to the command processor.

In another non-limiting embodiment, the arrangement may be configured wherein the flash memory is a NOR flash memory.

In another non-limiting embodiment, the arrangement may be configured wherein the flash memory is a vertical NAND flash memory.

In another non-limiting embodiment, a method for improving an input and an output consistency of a solid state drive is disclosed comprising: calculating a minimum system imposed read and write latency for the solid state drive; calculating an expected read latency and an expected write latency for the solid state drive based on the minimum system imposed read and write latency; calculating an amplification coefficient for write operations and an amplification coefficient for read operations based upon a model, calculating a final read latency and a final write latency for the solid state drive based upon the calculated expected read latency and the calculated expected write latency and the amplification coefficient for write operations and the amplification coefficient for read operations and operating the solid state drive according to the final read latency and the write latency.

In another non-limiting embodiment, the method may be accomplished wherein the amplification coefficient for write operations and amplification coefficient for read operations are calculated from a linear regression model.

In another non-limiting embodiment, the method may be accomplished wherein the linear regression model is a second order linear regression model.

In another non-limiting embodiment, the method may be accomplished wherein the minimum system imposed read latency is calculated as:

$$L_{Br} = \frac{1}{R'_{max}}$$

wherein $R'_{max}$ is a maximum possible input output read operations per second value for the solid state drive.

In another non-limiting embodiment, the method may be accomplished wherein the minimum system imposed write latency is calculated as:

$$L_{Bw} = \frac{1}{W'_{max}}$$

wherein $W'_{max}$ is a maximum possible input output read operations per second value for the solid state drive.

In another non-limiting embodiment, the method may be accomplished wherein the calculating the expected read latency and the expected write latency for the solid state drive is based on a workload and the solid state drive operating under ideal conditions.

In another non-limiting embodiment, the method may be accomplished wherein the second order linear regression model for read operations is of a form of:

$$\phi_r[x] = \theta_0 P_r^2 + \theta_1 P_r^2 + \theta_2$$

wherein $\phi_r[x]$ is the read amplification factor, $P_r$ is the read percentage and $\theta_n$ values are supervised learning coefficients.

In another non-limiting embodiment, the method may be accomplished wherein the second order linear regression model for write operations is of a form of:

$$\phi_w[x] = \theta_0 P_w^2 + \theta_1 P_w^2 + \theta_2$$

wherein $\phi_w[x]$ is the write amplification factor, Pw is the write percentage and $\theta_n$ values are supervised learning coefficients.

In another non-limiting embodiment, the method may be performed wherein the $\theta_n$ values are calculated from training data.

In another non-limiting embodiment, the method may be performed wherein the $\theta_n$ values are calculated from training data.

In another non-limiting embodiment, an apparatus for calculating a final write latency and a final read latency for a solid state drive is disclosed comprising means for calculating a minimum system imposed read and write latency for the solid state drive; means for calculating an expected read latency and an expected write latency for the solid state drive based on the calculated minimum system imposed read and write latency; means for calculating an amplification coefficient for write operations and an amplification coefficient for read operations and means for calculating a final read latency and a final write latency for the solid state drive based upon the calculated expected read latency and the expected write latency and the amplification coefficient for write operations and amplification coefficient for read operations; and means for operating the solid state drive to perform read operations and write operations based upon the final read latency and the final write latency.

In another non-limiting embodiment, the apparatus may be configured wherein the means for calculating the amplification coefficient uses a regression model.

In another non-limiting embodiment, the apparatus may be configured wherein the regression model is a linear regression model.

In another non-limiting embodiment, the apparatus may be configured wherein the linear regression model is a second order linear regression model.

In another non-limiting embodiment, a method for operating a solid state drive, is disclosed comprising calculating at least one of a minimum system imposed read and write latency for the solid state drive, calculating at least one of an expected read latency and an expected write latency for the solid state drive based upon the minimum system imposed read and write latency for the solid state drive, calculating at least one of an amplification coefficient for write operations and an amplification coefficient for read operations, calculating at least one of a final read latency and a write latency for the solid state drive based upon the calculated expected read latency and the expected write latency and the at least one of the amplification coefficient for write operations and the amplification coefficient for read operations and operating the solid state drive such that operations of the solid state drive do not exceed the at least one final read latency and write latency for the solid state drive.

In another non-limiting embodiment, the method may be performed wherein the amplification coefficient is calculated from a linear regression model.

In another non-limiting embodiment, the method may be performed wherein the linear regression model is a second order linear regression model.

In another non-limiting embodiment, a method of operating a solid state drive is disclosed comprising: calculating one of a minimum system imposed read and write latency for the solid state drive; calculating one of an expected read latency and an expected write latency for the solid state drive based upon the one of the minimum system imposed read and write latency for the solid state drive, calculating one of an amplification coefficient for write operations and an amplification coefficient for read operations, calculating one of a final read latency and a final write latency for the solid state drive based upon the calculated expected read latency and the calculated write latency and the calculated amplification coefficient for write operations and the amplification coefficient for read operations; and operating the solid state drive according to the final read latency and the write latency.

In another non-limiting embodiment, the method may be performed wherein the amplification coefficient is based upon a linear regression model.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:
1. A method for improving an input and an output consistency of a solid state drive, comprising:
  detecting, by a workload detection engine, a number of incoming commands from a host;

generating, by the workload detection engine, a current workload indication, wherein generating the current workload indication comprises:
  calculating a minimum system imposed read and write latency for the solid state drive;
  calculating an expected read latency for the solid state drive based on the minimum system imposed read latency;
  calculating an expected write latency for the solid state drive based on the minimum system imposed write latency;
  calculating an amplification coefficient for write operations and an amplification coefficient for read operations based upon a model;
  calculating a final read latency for the solid state drive based upon the calculated expected read latency and the amplification coefficient for read operations; and
  calculating a final write latency for the solid state drive based upon the calculated expected write latency and the amplification coefficient for write operations;
delivering the current workload indication to a throttling engine;
generating, by the throttling engine, one or more throttling latencies based on the calculated final read latency and the calculated final write latency;
delivering the one or more generated throttling latencies to a host responder; and
throttling, by the host responder, one or more completed commands, wherein throttling comprises accelerating sending the one or more completed commands to the host or queueing the one or more completed commands based on the one or more generated throttling latencies.

2. The method according to claim 1, wherein the model for the calculating the amplification coefficient for write operations and the amplification coefficient for read operations is a linear regression model.

3. The method according to 2, wherein the linear regression model is a second order linear regression model.

4. The method according to claim 1, wherein the minimum system imposed read latency is calculated as:

$$L_{Br} = \frac{1}{R'_{max}}$$

wherein $R_{max}'$ is a maximum possible input output read operations per second value for the solid state drive.

5. The method according to claim 1, wherein the minimum system imposed write latency is calculated as:

$$L_{Bw} = \frac{1}{W'_{max}}$$

wherein $W_{max}'$ is a maximum possible input output read operations per second value for the solid state drive.

6. The method according to claim 1, wherein the calculating the expected read latency and the expected write latency for the solid state drive is based on a workload.

7. The method according to claim 3, wherein the second order linear regression model for read operations is of a form of:

$$\phi_r[X] = \theta_0 P_r^2 + \theta_1 P_r^2 + \theta_2$$

wherein $\phi_r[x]$ is a read amplification factor, $P_r$ is a read percentage and en values are supervised learning coefficients.

8. The method according to claim 3, wherein the second order linear regression model for write operations is of a form of:

$$\phi_w[x] = \theta_0 P_w^2 + \theta_1 P_w^2 + \theta_2$$

wherein $\phi_w[x]$ is a write amplification factor, Pw is a write percentage and $\theta_n$ values are supervised learning coefficients.

9. The method according to claim 7, wherein the $\theta_n$ values are calculated from training data.

10. The method according to claim 8, wherein the $\theta_n$ values are calculated from training data.

11. An apparatus for calculating a final write latency and a final read latency for a solid state drive, comprising:
  means for detecting a number of incoming commands from a host;
  means for generating a current workload indication, wherein generating the current workload indication comprises:
    means for calculating a minimum system imposed read and write latency for the solid state drive;
    means for calculating an expected read latency for the solid state drive based on the calculated minimum system imposed read latency;
    means for calculating an expected write latency for the solid state drive based on the calculated minimum system imposed read and write latency;
    means for calculating an amplification coefficient for write operations and an amplification coefficient for read operations;
    means for calculating the final read latency for the solid state drive based upon the calculated expected read latency and the amplification coefficient for write operations; and
    means for calculating the final write latency for the solid state drive based upon the calculated expected write latency and the amplification coefficient for write operations;
  means for delivering the current workload indication to a throttling engine;
  means for generating one or more throttling latencies based on the calculated final read latency and the final write latency;
  means for delivering the one or more generated throttling latencies to a host responder; and
  means for throttling one or more completed commands, wherein throttling comprises accelerating sending the one or more completed commands to the host or queueing the one or more completed commands based on the one or more generated throttling latencies.

12. The apparatus according to claim 11, wherein the means for calculating the amplification coefficient for write operations and the amplification coefficient for read operations uses a regression model.

13. The apparatus according to claim 12, wherein the regression model is a linear regression model.

14. The apparatus according to claim 13, wherein the linear regression model is a second order linear regression model.

15. A method for operating a solid state drive, comprising:
   detecting, by a workload detection engine, a number of incoming commands from a host;
   generating, by the workload detection engine, a current workload indication, wherein generating the current workload indication comprises:
      calculating at least one of a minimum system imposed read and write latency for the solid state drive;
      calculating at least one of an expected read latency based upon the minimum system imposed read latency for the solid state drive and an expected write latency for the solid state drive based upon the minimum system imposed write latency for the solid state drive;
      calculating at least one of an amplification coefficient for write operations and an amplification coefficient for read operations; and
      calculating at least one of a final read latency for the solid state drive based upon the calculated expected read latency and the amplification coefficient for read operations and a final write latency for the solid state drive based upon the calculated expected write latency and the amplification coefficient for write operations;
   delivering the current workload indication to a throttling engine;
   generating, by the throttling engine, one or more throttling latencies based on the calculated final read latency and the calculated final write latency;
   delivering the one or more generated throttling latencies to a host responder; and
   throttling, by the host responder, operations of sending one or more completed commands, wherein throttling is based upon not exceedirg the at least one final read latency and final write latency for the solid state drive.

16. The method according to claim 15, wherein the amplification coefficient for write operations and the amplification coefficient for read operations is calculated from a linear regression model.

17. The method according to 16, wherein the linear regression model is a second order linear regression model.

18. A method of operating a solid state drive, comprising:
   detecting, by a workload detection engine, a number of incoming commands from a host;
   generating, by the workload detection engine, a current workload indication, wherein generating the current workload indication comprises:
      calculating one of a minimum system imposed read and write latency for the solid state drive;
      calculating one of an expected read latency for the solid state drive based upon the minimum system imposed read latency and an expected write latency for the solid state drive based upon the minimum system imposed write latency for the solid state drive;
      calculating one of an amplification coefficient for write operations and an amplification coefficient for read operations; and
      calculating one of a final read latency for the solid state drive based upon the calculated expected read latency and the calculated amplification coefficient for read operations and a final write latency for the solid state drive based upon the calculated expected write latency and the calculated amplification coefficient for write operations;
   delivering the current workload indication to a throttling engine;
   generating, by the throttling engine, one or more throttling latencies based on the calculated final read latency and the calculated final write latency;
   delivering the one or more generated throttling latencies to a host responder; and
   throttling, by the host responder, one or more completed commands, wherein throttling comprises accelerating sending the one or more completed commands to the host or queueing the one or more completed commands based on the one or more generated throttling latencies.

19. The method according to claim 18, wherein the amplification coefficient for write operations and the amplification coefficient for read operations is based upon a linear regression model.

* * * * *